(12) United States Patent
Moorman et al.

(10) Patent No.: US 7,913,828 B2
(45) Date of Patent: Mar. 29, 2011

(54) CLUTCH WITH DUAL AREA PISTON AND INDEPENDENT PRESSURE CONTROL

(75) Inventors: Steven P. Moorman, Dexter, MI (US); Andrew W. Phillips, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 484 days.

(21) Appl. No.: 12/036,376

(22) Filed: Feb. 25, 2008

(65) Prior Publication Data

US 2009/0211862 A1 Aug. 27, 2009

(51) Int. Cl.
*F16D 25/0635* (2006.01)
*F16D 25/12* (2006.01)
(52) U.S. Cl. .................. 192/85.32; 192/52.4; 192/85.63
(58) Field of Classification Search ................. 192/52.4, 192/85.32
See application file for complete search history.

(56) References Cited

U.S. PATENT DOCUMENTS

| | | | | |
|---|---|---|---|---|
| 4,875,561 | A | * | 10/1989 | Schneider et al. ............ 475/180 |
| 5,950,787 | A | * | 9/1999 | Murasugi et al. .......... 192/85.25 |
| 7,104,380 | B2 | * | 9/2006 | Bishop et al. .............. 192/85.32 |

* cited by examiner

*Primary Examiner* — Richard M. Lorence

(57) ABSTRACT

The present invention provides a clutch having two pistons, a first piston defining a first, smaller area and a second piston, defining a second, larger area. The separate pistons are independently provided with flows of pressurized hydraulic fluid from first and second independent modulatable control valves. Engagement of the clutch may be rapid by providing hydraulic fluid to the smaller area piston, provide greater engagement force by providing hydraulic fluid to the larger area piston or a combination of speed and force by utilizing modulated or unmodulated flows of hydraulic fluid to both pistons.

16 Claims, 2 Drawing Sheets

CLUTCH WITH DUAL AREA PISTON AND INDEPENDENT PRESSURE CONTROL

FIELD

Figure 1:
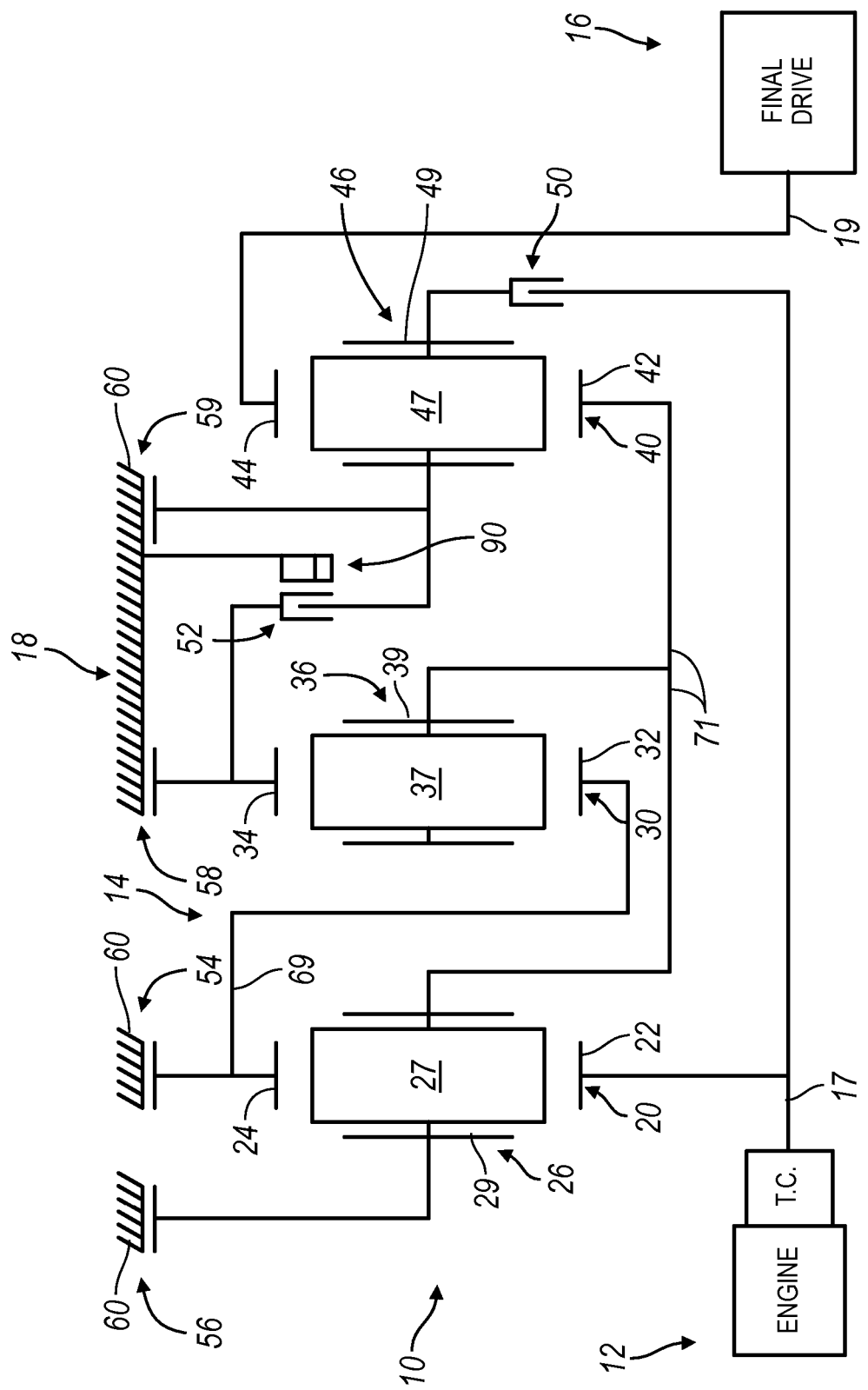

The present disclosure relates to a clutch having a dual area piston and more particularly to a clutch having two pistons of distinct areas and dual pressure valves for providing independent control of the pressure applied to each piston. The clutch finds particular application in multiple speed automatic transmissions for motor vehicles.

BACKGROUND

The statements in this section merely provide background information related to the present disclosure and may or may not constitute prior art.

A current design class of multiple speed automatic transmissions comprehends a plurality of planetary gear assemblies having their sun gears, planet carriers and ring gears interconnected by permanent connections and selectively connected by clutches or grounded by brakes. The clutched and brakes are generally engaged or activated by hydraulic fluid pressure.

The speed and force with which the clutches and brakes can, should or must be engaged is a major factor in the performance of such transmissions and is the subject of much study. If speed is the more significant design parameter, the clutch piston can be made smaller such that a typical flow of pressurized fluid will quickly move the piston. On the other hand, if force is more important, the clutch piston may be made larger (have a larger area). While it will obviously not move as quickly, given the same pressurized fluid flow provided to a smaller piston, it will be capable of generating higher force.

An acknowledged engineering compromise to this problem is a clutch engaged or activated by a dual area piston. The flow of pressurized hydraulic fluid is provided to a modulating control valve and thence to a shift valve which directs the modulated flow of fluid to the selected larger or smaller area of the piston. Thus, by incorporation and control of the shift valve, a single clutch and piston can produce rapid, low force movement utilizing the smaller area of the piston and slower, higher force movement utilizing the larger area of the piston.

In practice, however, this approach has revealed a shortcoming. In certain shift situations, it is necessary to reposition the shift valve in the middle of a shift. Whenever this is done, the pressure level on one side is immediately transferred to the other. When this occurs during a shift, poor torque capacity control may result.

Thus it is apparent that improvements in dual area clutches and actuating systems for use in automatic transmissions are desirable.

SUMMARY

The present invention provides a clutch having two pistons, a first piston defining a first, smaller area and a second piston defining a second, larger area. The separate areas of the pistons are independently provided with flows of pressurized hydraulic fluid from first and second independent modulatable control valves. Engagement of the clutch may then be rapid by utilizing the smaller area piston, provide greater engagement force by utilizing the larger area piston or a combination of speed and force by utilizing modulated or unmodulated hydraulic fluid flows to both pistons. Clutch engagement speed and force are also controlled by an orifice disposed in each fluid line between the control valves and the pistons. The dual area clutch and independent control valves of the present invention find particular application in automatic transmissions for motor vehicles in which they may be utilized in association with both clutches and brakes.

Thus it is an object of the present invention to provide a clutch incorporating dual area pistons and having independent pressure control.

It is a further object of the present invention to provide a clutch incorporating dual area pistons and dual modulating control valves.

It is a still further object of the present invention to provide a clutch incorporating dual area pistons and dual modulating control valves which independently control the hydraulic pressure applied to each piston.

It is a still further object of the present invention to provide a clutch incorporating dual modulating control valves, flow control orifices and dual area pistons.

It is a still further object of the present invention to provide a clutch incorporating dual area pistons and dual modulating control valves having particular application in automatic transmissions for motor vehicles.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
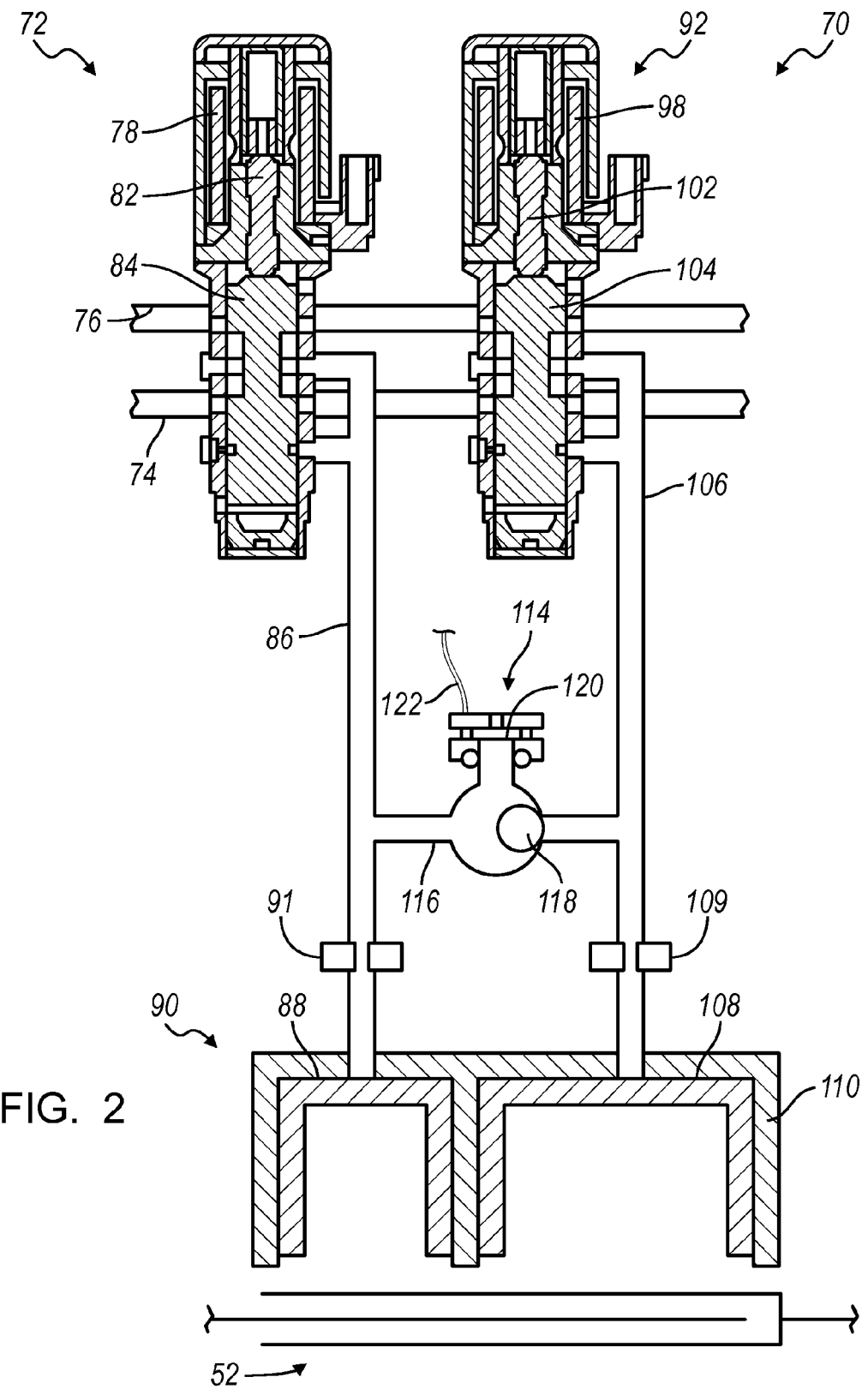

FIG. 1 is a diagrammatic view of a multiple speed automatic transmission incorporating the present invention; and FIG. 2 is a diagrammatic view of a hydraulic circuit of a clutch or brake having a dual area piston with independent pressure control according to the present invention.

DETAILED DESCRIPTION

The following description is merely exemplary in nature and is not intended to limit the present disclosure, application, or uses.

With reference now to FIG. 1, a motor vehicle powertrain is illustrated and generally designated by the reference number 10. The motor vehicle powertrain 10 includes an engine and torque converter 12, a multiple speed automatic transmission 14 and a conventional final drive assembly 16.

The automatic transmission 14 includes an input shaft 17 connected to the output of the engine and torque converter 12, a planetary gear configuration 18 and an output shaft 19 connected to the final drive assembly 16. The planetary gear configuration 18 includes a first planetary gear set 20, a second planetary gear set 30 and a third planetary gear set 40.

The first planetary gear set 20 includes a first sun gear 22, a first ring gear 24 and a first planet gear assembly 26. The first planet gear assembly 26 includes a first plurality of planet gears 27 rotatably disposed on a first planet gear carrier 29 and arranged in meshing relationship with both the first sun gear 22 and the first ring gear 24.

The second planetary gear set 30 includes a second sun gear 32, a second ring gear 34 and a second planet gear assembly 36. The second planet gear assembly 36 includes a second plurality of planet gears 37 rotatably disposed on a second planet gear carrier 39 and arranged in meshing relationship with both the second sun gear 32 and the second ring gear 34.

The third planetary gear set 40 includes a third sun gear 42, a third ring gear 44 and a third planet gear assembly 46. The third planet gear assembly 46 includes a third plurality of planet gears 47 rotatably disposed on a third planet gear carrier 49 and arranged in meshing relationship with both the third sun gear 42 and the third ring gear 44.

The planetary gear configuration 18 also includes a plurality of selectable torque transmitting devices. Two of the torque transmitting devices, 50 and 52, selectively connect two rotating members and are thus properly characterized as clutches. Four of the torque transmitting devices, 54, 56, 58 and 59, selectively ground, i.e., connect to a stationary, a rotating member and are thus properly characterized as brakes or reaction clutches.

Several of the components of the planetary gear sets 20, 30 and 40 are permanently connected to other components. The input shaft 17 is connected to the first sun gear 22. The output shaft 19 is connected to the third ring gear 44. The first ring gear 24 is connected to the second sun gear 32 through an interconnecting member 69. The first planet gear carrier 29 is connected to the second planet gear carrier 39 and the third sun gear 42 through an interconnecting member 71.

The first sun gear 22 is selectively connected to the third planet gear carrier 49 by a first clutch 50. The second ring gear 34 is selectively connected to the third planet gear carrier 49 by a second clutch 52. The first ring gear 24 is selectively grounded to a housing 60 of the transmission 14 by a first brake 54. The first planet gear carrier 29 is selectively grounded to the housing 60 by a second brake 56. The second ring gear 34 is selectively grounded to the housing by a third brake 58. Finally, the third planet gear carrier 49 is selectively grounded to the housing 60 by a fourth brake 59.

As noted above, the automatic transmission 14 is capable of providing multiple forward speed, gear and torque ratios by selective engagement, in sequence, of various combinations of the just described clutches 50 and 52 and brakes 54, 56, 58 and 59. Such operation is beyond the scope of this patent. Further explanation, however, may be found in U.S. Pat. No. 6,723,019 which is hereby incorporated by reference.

Turning now to FIG. 2, a hydraulic circuit for activating or engaging any of the clutches 50 and 52 and the brakes 54, 56, 58 and 59 in an automatic transmission 14 is illustrated and designated by the reference number 70. It should be understood that while primarily intended for use in automatic transmissions, the hydraulic circuit 70 may find broad application in diverse hydraulic device control applications. The hydraulic circuit 70 includes a first solenoid control valve 72 which is supplied with pressurized hydraulic fluid or oil in a line 74. Hydraulic fluid or oil flows out of the first solenoid control valve 72 in an exhaust or return line 76. The first solenoid control valve 72 includes a first electromagnetic coil 78, a first axially, bi-directionally translatable plunger 82 and a first valve spool 84 which, depending upon its axial position, supplies and exhausts hydraulic fluid or oil from a first fluid line or passageway 86 communicating with a first, smaller area clutch or brake activating piston 88 of a dual area piston assembly 90 through a flow control orifice 91.

The hydraulic circuit 70 also includes a second solenoid control valve 92 which is supplied with pressurized hydraulic fluid or oil in the line 74. Hydraulic fluid or oil flows out of the second solenoid control valve 92 in the exhaust or return line 76. The second solenoid control valve 92 includes a second electromagnetic coil 98, a second axially, bi-directionally translatable plunger 102 and a second valve spool 104 which, depending upon its axial position, supplies and exhausts hydraulic fluid or oil from a second fluid line or passageway 106 communicating with a second, larger area clutch or brake activating piston 108 of the dual area piston assembly 90 through a flow control orifice 109.

The solenoid control valves 72 and 92 are both preferably modulating valves which are commonly referred to as variable bleed solenoids (VBS) which may operate on a pulse width modulated (PWM) signal and include a regulator valve or they may be direct acting (VFS) solenoid valves. Alternatively, the solenoid control valves 72 and 92 may be two position (on-off) valves.

The dual area piston assembly 90 also includes a housing 110 which receives the first and second pistons 88 and 108 and maintains them in operable alignment with a clutch assembly 52 which is representative of all of the clutches and brakes illustrated in FIG. 1. The configuration of the pistons 88 and 108 as well as that of the housing 110 will depend upon the configuration and location of the associated clutch or brake but they will typically be annular with the first, smaller area piston 88 having a smaller nominal diameter which is surrounded by the second, larger area piston 108 which has a larger nominal diameter.

Disposed between the first and the second lines or passageways 86 and 106 is an optional dual input ball check assembly 114 including a chamber 116 communicating with both the first fluid line or passageway 86 and the second fluid line or passageway 106. Disposed within the chamber 116 is a ball check 118 and communicating with the chamber 116 is a pressure sensor 120. The ball check assembly 116 is supplied with hydraulic fluid or oil from both the first and the second fluid lines or passageways 86 and 106 and, because of movement of the ball check 118, the pressure sensor 120 is subjected to, reads and provides data or a signal in a wire or cable 122 regarding the magnitude of the higher of the two pressures in the first and the second fluid lines or passageways 86 and 106. The signal from the pressure sensor 120 may be supplied to operating or control devices to provide feedback regarding the higher instantaneous pressure in the fluid lines or passageways 86 and 106 or the signal may be provided to diagnostic devices which ensures proper operation of the dual area piston assembly 90 and provide fault signals, for example. As noted above, however, the dual input ball check assembly 114 is an optional component.

The dual area piston assembly 90 according to the present invention has four modes of operation: a) utilizing only the first, smaller piston 88, b) utilizing only the second, larger piston 108, c) utilizing both the first and the second pistons 88 and 108 and d) utilizing one of the pistons 88 or 108 to engage the clutch 52 and then both of the pistons 88 and 108 to modulate the clutch 52. The particular mode of operation chosen will be based on shift requirements. For example, a high torque shift may require that both pistons 88 and 108 are modulated together in order to achieve sufficient torque throughput to complete the shift. However, a high torque shift may also require the shortest possible delay before starting the shift. Under the circumstances, mode d) may be chosen in order to minimize delay while providing the required torque capacity. Another example is a low torque shift during which the smaller area piston 88 only is provided with modulated pressure hydraulic fluid. This provides minimum shift delay, maximum resolution and the smallest sensitivity to pressure errors due to, for example, circuit restrictions, overshoot, undershoot, instability and solenoid inaccuracy.

The description of the invention is merely exemplary in nature and variations that do not depart from the gist of the invention are intended to be within the scope of the invention. Such variations are not to be regarded as a departure from the spirit and scope of the invention.

What is claimed is:

1. A dual area piston assembly comprising, in combination,
a first modulating solenoid valve that is electrically actuated for selectively providing a first flow of pressurized hydraulic fluid,
a second modulating solenoid valve that is electrically actuated for selectively providing a second flow of pressurized hydraulic fluid, and
a clutch operator having a housing defining a first cylinder adapted to receive a first piston having a first surface area and said first flow of hydraulic fluid and a second cylinder adapted to receive a second piston having a second surface area different from said first surface area and said second flow of hydraulic fluid.

2. The dual area piston assembly of claim 1 further including a clutch having friction plates and acted upon by said first and said second piston.

3. The dual area piston assembly of claim 1 further including a ball check assembly and a pressure sensor for sensing hydraulic pressure in one of said first and said second flows.

4. The dual area piston assembly of claim 1 further including a flow control orifice disposed between each of said solenoid valves and said cylinders.

5. The dual area piston assembly of claim 1 wherein said first and said second pistons are annular and said first piston is surrounded by said second piston.

6. The dual area piston assembly of claim 1 wherein said solenoid valves include inlet and exhaust ports.

7. A dual area piston clutch comprising, in combination,
a first electrically actuated and modulating solenoid valve having a first fluid output,
a second electrically actuated and modulating solenoid valve having a second fluid output,
a clutch operator having a first piston defining a first surface area acted upon by said first fluid output and a second piston defining a second surface area greater than said first surface area and acted upon by said second fluid output, and
a clutch engaged by translation of said first and said second pistons.

8. The dual area piston clutch of claim 7 wherein said first piston engages said clutch more quickly and with less force than said second piston.

9. The dual area piston clutch of claim 7 wherein said solenoid valves include inlet and exhaust ports.

10. The dual area piston clutch of claim 7 further including an orifice disposed between each of said fluid outputs and said pistons.

11. The dual area piston clutch of claim 7 further including a ball check assembly and a pressure sensor for sensing hydraulic pressure in one of said first and said second fluid outputs.

12. The dual area piston clutch of claim 7 wherein said clutch includes interleaved clutch plates.

13. A clutch assembly having a dual piston operator comprising, in combination,
a first modulating solenoid valve having a first fluid output and a first solenoid coil for direct actuation of the first modulating solenoid valve by an electrical current,
a second modulating solenoid valve having a second fluid output and a second solenoid coil for direct actuation of the second modulating solenoid valve by an electrical current,
a clutch operator having a housing defining a first cylinder and a second cylinder, said first cylinder in fluid communication with said first fluid output of said first solenoid valve and receiving a first piston having a first surface area, said second cylinder in fluid communication with said second fluid output of said second solenoid valve and receiving a second piston having a second surface area larger than said first surface area, and
a clutch having interleaved clutch plates engaged by translation of said first and said second pistons.

14. The clutch assembly of claim 13 further including a ball check assembly and a pressure sensor for sensing hydraulic pressure of one of said first and said second fluid outputs.

15. The clutch assembly of claim 13 wherein said first piston engages said clutch more quickly and with less force than said second piston.

16. The clutch assembly of claim 13 further including an orifice disposed between each of said solenoid valve outputs and said respective cylinders.

* * * * *